Patented June 13, 1944

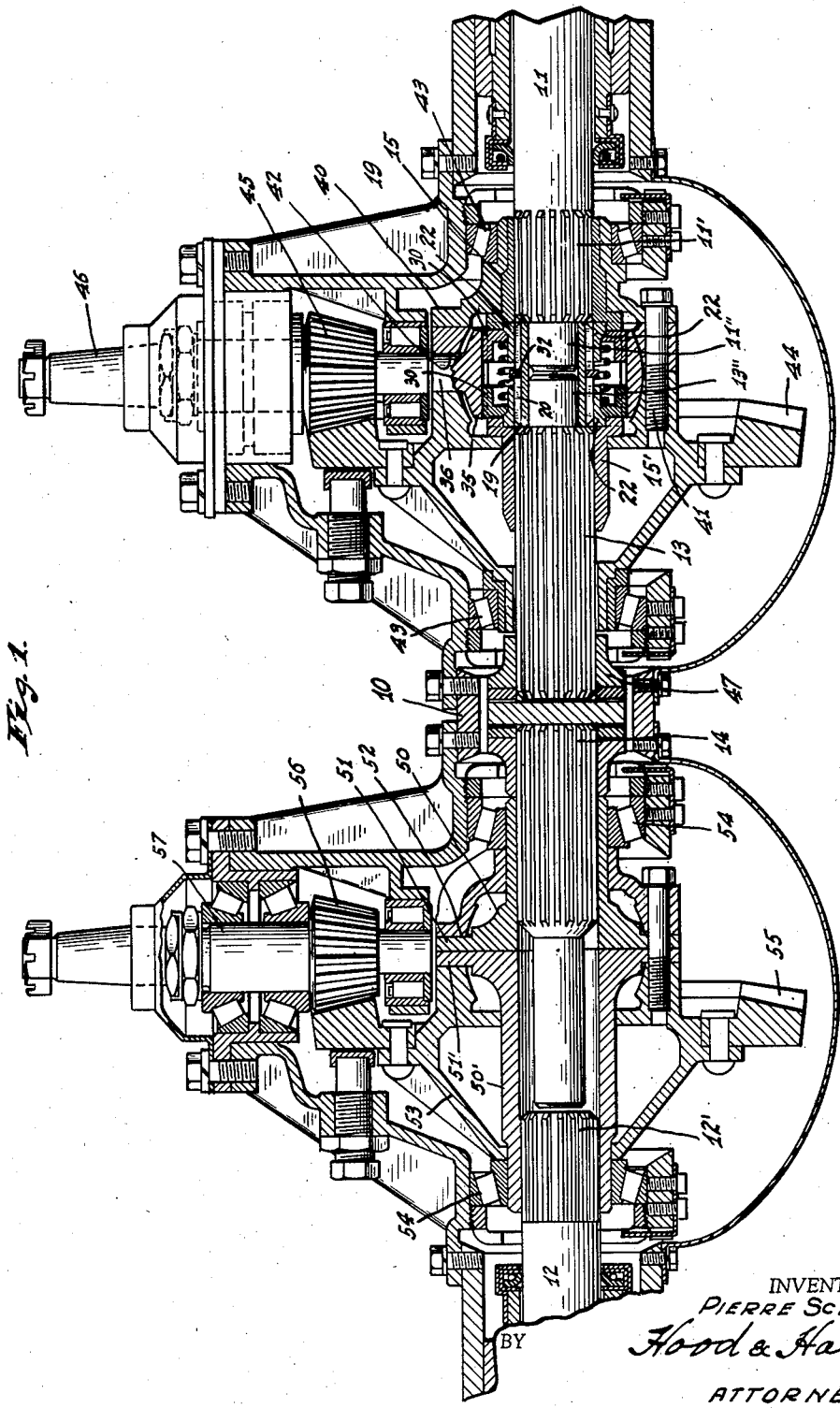

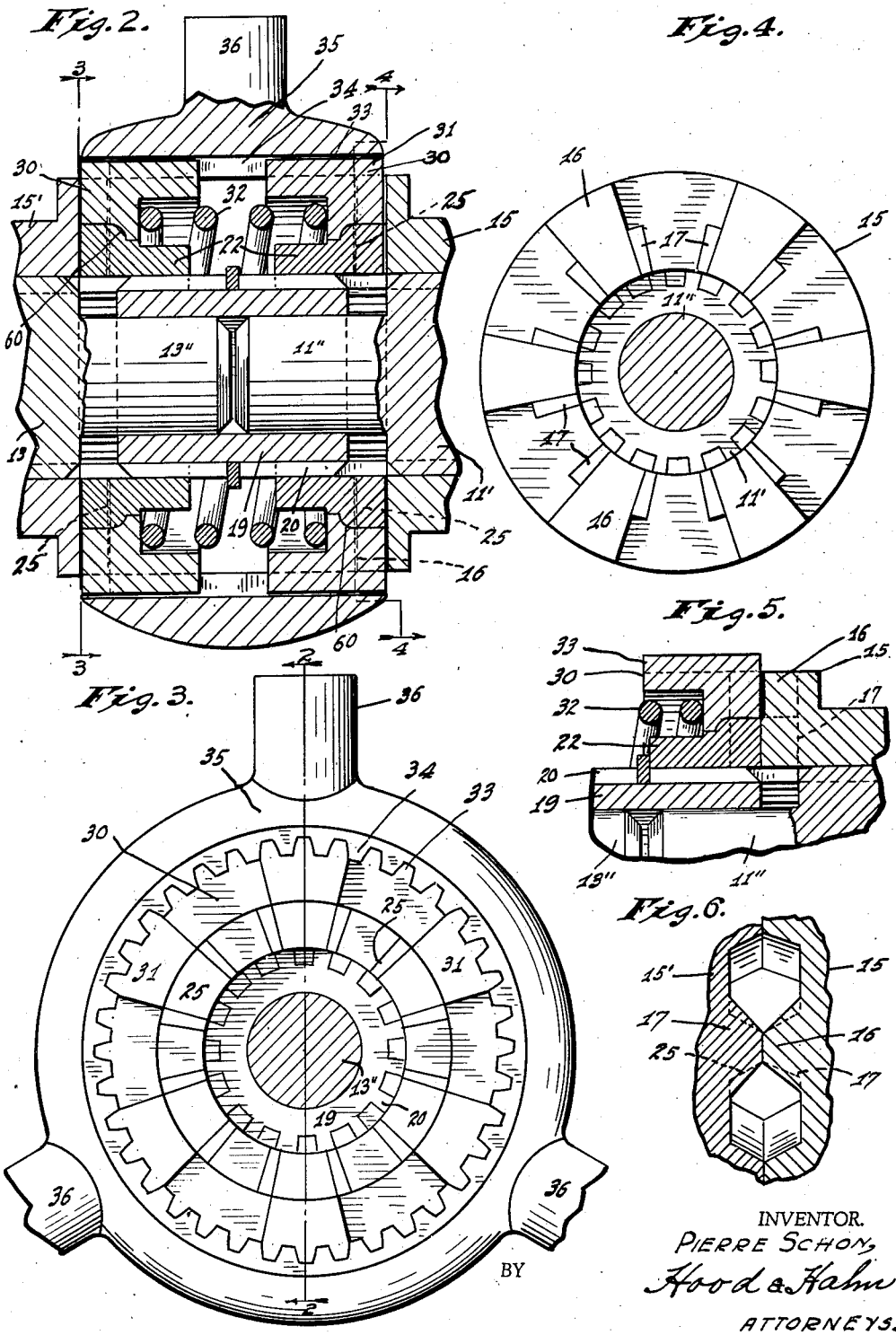

2,351,234

UNITED STATES PATENT OFFICE 2,351,234

DUAL POWERED AXLE

Pierre Schon, Indianapolis, Ind., assignor to Marmon-Herrington Company, Inc., Indianapolis, Ind., a corporation of Indiana Application July 22, 1943, Serial No. 495,705

3 Claims. (Cl. 74—389.5)

The object of my invention is to provide an automotive axle structure comprising two relatively rotatable wheel-driving output shafts wherein power from one source may be applied to both shafts through an appropriate differential connection permitting overrunning of either shaft relative to said power, and wherein power from a second independent source may be applied to one of said shafts without interfering with the capacity of the other shaft to overrun or underrun the shaft receiving power from said second source.

The accompanying drawings illustrate an embodiment of my invention wherein the two output shafts are designed to be directly connected to traction wheels which support the axle structure, but it is to be borne in mind that the structure is such that it may be utilized as a jack shaft where the two output shafts are otherwise connected respectively to two traction wheels or power-delivery trains.

Fig. 1 is a horizontal axial section;

Fig. 2 is an enlarged section, on the same plane as Fig. 1 and on line 2—2 of Fig. 3, of the structure which permits differential or relative rotation of the two output shafts;

Fig. 3 is a section on line 3—3 of Fig. 2;

Fig. 4 is a section on line 4—4 of Fig. 2;

Fig. 5 is a fragmentary sectional detail of a portion of the differential coupling mechanism; and Fig. 6 is a fragmentary sectional detail of parts of said coupling mechanism.

In the drawings 10 indicates a housing within which are journalled two aligned output shafts 11 and 12 each splined at its inner end, as indicated at 11' and 12', respectively, and aligned with the two shafts 11 and 12 between the inner ends thereof are splined coupling shafts 13 and 14. Splined on part 11' of output shaft 11 is a clutch element 15, the inner face of which is provided with a plurality of radial clutch teeth 16 each of which is flanked at its inner end with cam surfaces 17. Splined upon the coupling shaft 13 is a clutch element 15' which is exactly like element 15 and is provided on its inner face with radial clutch teeth and flanking cam surfaces the same as parts 16 and 17 of clutch element 15. The inner adjacent ends 11" and 13" of shafts 11 and 13 are ensmalled, as indicated, and journalled on these ensmalled parts is a sleeve 19 having external splined teeth 20. Splined upon the splines 20 are cam elements 22—22 each of which, on its outer face, is provided with a plurality of radial cam teeth 25 positioned to coact with the cam surfaces 17, 17, the parts 25 normally lying between teeth 16 and engaging the cam surfaces 17. Sleeved over each cam element 22 is a clutch ring 30 provided, on its outer face, with a circumferential series of radial clutch teeth 31 which normally lie between and interdigitated with the outer ends of clutch teeth 16. A spring 32 lying between the two clutch rings 30, 30 normally holds them in their outer position with their teeth 31 interdigitated with the outer ends of teeth 16. The outer peripheries of the clutch rings 30 are provided with spline teeth 33 which interdigitate with spline teeth 34 of a driving spider 35 which encompasses the two clutch rings 30, 30, and is provided with a plurality of radial pins 36.

Journalled upon the hubs of elements 15 and 15' is a driving shell 40 made in two parts clamped together by bolts 41 in order to permit the formation of pockets 42 which receive pins 36. Shell 40 is rotatively supported in casing 10 by bearings 43, 43. Secured to shell 40 is a main input gear 44 meshing with a pinion 45 secured to the input shaft 46.

The adjacent ends of the coupling shafts 13 and 14 are connected by a coupling 47 splined upon said shafts 13 and 14.

Splined upon shaft 14 is a spider element 50 provided with a plurality of radial half-cylindrical pins 51 and splined upon splines 12' of shaft 12 is a similar spider 50' having half-cylindrical radial pins 51' which complement the pins 51, the composite pin 51—51' being received in pockets 52 of a shell 53 journalled on the hubs of the parts 50, 50'. The assembly 50—50'—53 is journalled in casing 10 by bearings 54—54 and shell 53 carries an input gear 55 meshing with a pinion 56 on the second input shaft 57.

The cam ring 22 and associate clutch ring 30 are shouldered, as indicated at 60 (Fig. 2) so that axial displacement of cam ring 22 against the force of spring 32 will displace the associate clutch ring 30 to extract its teeth 31 from between the clutch teeth 16 of the associate element 15 or 15'.

The operation is as follows:

Assuming power to be applied to shaft 46, that power is delivered through the differential structure, which has been described, to the output shaft 11 and coupling shaft 13 and thence from coupling shaft 13 through coupling shaft 14 and the assembly 50—50' to the output shaft 12. If the road conditions are such as to require a one traction wheel to overrun the other, element 19 of the overrunning wheel will be rotated relative to the associate clutch ring 22 to cause cam surfaces 17 to engage cam teeth 25 to displace the cam 22 inwardly and, in turn, displace the associate clutch ring 30 inwardly to extract its teeth 31 from between teeth 16 of the associate element 19. It will be noted that clutch teeth 31 are narrower than the spaces between the outer ends of clutch teeth 16 so that this necessary relative rotation is possible. The displacement of clutch ring 30 permits a differential rotation between the two output shafts 11 and 12, by successive steps and restoration of the displaced clutch rings 30.

The differential mechanism which I have illustrated and described is not my invention (see Patent 2,231,968, Thornton, Feb. 18, 1941), but it is typical of a type of differential connection between two output shafts of such character that rotation of one of the output shafts by force directly applied thereto, cannot result in reverse rotation of the other output shafts through the medium of the differential mechanism, and it is to be understood that any differential mechanism of this character may be utilized in my apparatus.

When power, from an independent source, is applied to shaft 57, that power is delivered directly to shaft 12 so as to propel the vehicle. Power is also delivered through coupling shafts 14—13 to bring the forward faces of the clutch teeth of element 15' against the rear faces of the companion teeth of the adjacent left-hand element 30. The cam faces 17 of element 15' fit snugly between cam faces 25 of the left-hand element 22 and, as both elements 22 are splined on 19 the force which brings the forward faces of the teeth of element 15' against the rear faces of the mating teeth of adjacent element 22 to rotate the two elements 22, 22, causes the cams of the right-hand element 22 to ride the cams of element 15 and thus force element 30 to the left and permit spider 35 to overrun element 15 and shaft 11. It will be seen, therefore, that the driving effect of 15' on 15 will be a function of the strength of spring 32 and the cooperation of the cams of the right-hand elements 22 and 15.

It will now be appreciated that two separate and independent power units may be provided for my improved axle, one for connection with the input shaft 46 and one for connection with input shaft 57. The power unit connected with input shaft 46 will be capable of exerting driving force upon both output shafts 11 and 12, either of said shafts being capable, because of road conditions, of over-running the other without exerting any reverse driving force on the other. The power unit connected with input shaft 57 will be capable of exerting driving force upon output shaft 12 only (the driving effect through the cams of element 15 and its companion part 22 being negligible), leaving shaft 11 and spider 35 free to overrun shaft 12 according to road conditions.

Nevertheless, the left-hand engine is capable of forwardly rotating spider 35 and thus starting the right-hand engine from rest.

When only the left-hand engine is driving, and the vehicle negotiates a right-hand turn, spider 35 overruns element 15 and during a left-hand turn spider 35 overruns element 15'. When the right-hand engine is driving, element 15 overruns spider 35 during left-hand turns and element 15' overruns spider 35 during right-hand turns.

It is apparent, therefore, that my improved axle, when associated with dual engines, provides for operation of a vehicle with a minimum of fuel consumption according to load and road conditions, while at all times adequate traction effect may be obtained and at all times each output shaft is free to rotate relative to the other in accordance with road conditions.

A vehicle equipped with my improved axle and dual power units is very efficiently maneuverable. Under heavy load conditions both power units may be utilized, medium load conditions may be met by the unit connected to input shaft 46, and light load conditions may be met by the power unit connected to input shaft 57, all without interfering with freedom of independent relative rotation of the output shafts induced by road conditions and, at the same time, avoiding the possibility of one power unit exerting a drag on the other power unit.

For convenience, in the claims, the essential differential connection between shafts 11 and 12 will be designated as a "clutch type differential."

I claim as my invention:

1. An axle structure comprising, a housing, two output shafts journalled in said housing, two input shafts journalled in said housing, a clutch type differential connection between one of said input shafts and the two output shafts, and a driving connection between the other input shaft and only one of the output shafts.

2. An axle structure comprising, a housing, two output shafts journalled in said housing, two input shafts journalled in said housing, a clutch-type differential having its input element connected to one of said input shafts and its two output elements connected respectively to the two output shafts, a connection between the other input shaft and one of the output shafts, and a connection between said last-mentioned input shaft and one of the output elements of the differential.

3. An axle structure comprising, a housing, two output shafts journalled in said housing, two input shafts journalled in said housing, a clutch-type differential having its input element connected to one of said input shafts and one of its output elements connected to one of said output shafts, a coupling shaft structure connected to the other output element of the differential, a connector-structure between said coupling-shaft structure and the other output shaft, and a driving connection between said connector-structure and the other input shaft.

PIERRE SCHON.